US005700958A

United States Patent [19]
Lew et al.

[11] Patent Number: 5,700,958
[45] Date of Patent: *Dec. 23, 1997

[54] INERTIA FORCE FLOWMETER WITH TRANSVERSE PRESSURE GRADIENT SENSORS

[76] Inventors: Hyok S. Lew; Yon S. Lew, both of 7890 Oak St., Arvada, Colo. 80005

[*] Notice: The term of this patent shall not extend beyond the expiration date of Pat. No. 5,602,344.

[21] Appl. No.: 644,958

[22] Filed: May 13, 1996

Related U.S. Application Data

[63] Continuation-in-part of Ser. No. 299,362, Sep. 1, 1994, and a continuation-in-part of Ser. No. 523,811, Sep. 5, 1995.

[51] Int. Cl.[6] .................................................. G01F 1/78
[52] U.S. Cl. ............................................... 73/861.357
[58] Field of Search ........................ 73/861.355, 861.356, 73/861.357, 861.24, 861.21

[56] References Cited

U.S. PATENT DOCUMENTS

| | | | |
|---|---|---|---|
| 5,226,330 | 7/1993 | Lew | 73/861.38 |
| 5,337,616 | 8/1994 | Lew | 73/861.38 |
| 5,359,901 | 11/1994 | Lew et al. | 73/861.38 |
| 5,425,277 | 6/1995 | Lew | 73/861.357 |
| 5,501,106 | 3/1996 | Lew et al. | 73/861.038 |

Primary Examiner—George M. Dombroske
Assistant Examiner—Jewel V. Artis

[57] ABSTRACT

An inertia force mass flowmeter comprises at least one conduit under a lateral reciprocating motion with its amplitude distributed along the center line of the conduit in a symmetric or antisymmetric mode about the center section of the conduit, two differential or absolute pressure sensors detecting the alternating transverse pressure gradient existing in the fluid contained in the conduit in directions parallel to the direction of the lateral reciprocating motion of the conduit respectively at two different sections of the conduit respectively included in the two opposite halves of the conduit, and data processing device that determines the mass flow rate of fluid moving through the conduit as a function of an electrical variable related to a phase angle difference between two alternating electrical signals respectively representing the alternating transverse pressure gradient detected respectively at the two different sections of the conduit by the two differential or absolute pressure sensors.

20 Claims, 2 Drawing Sheets

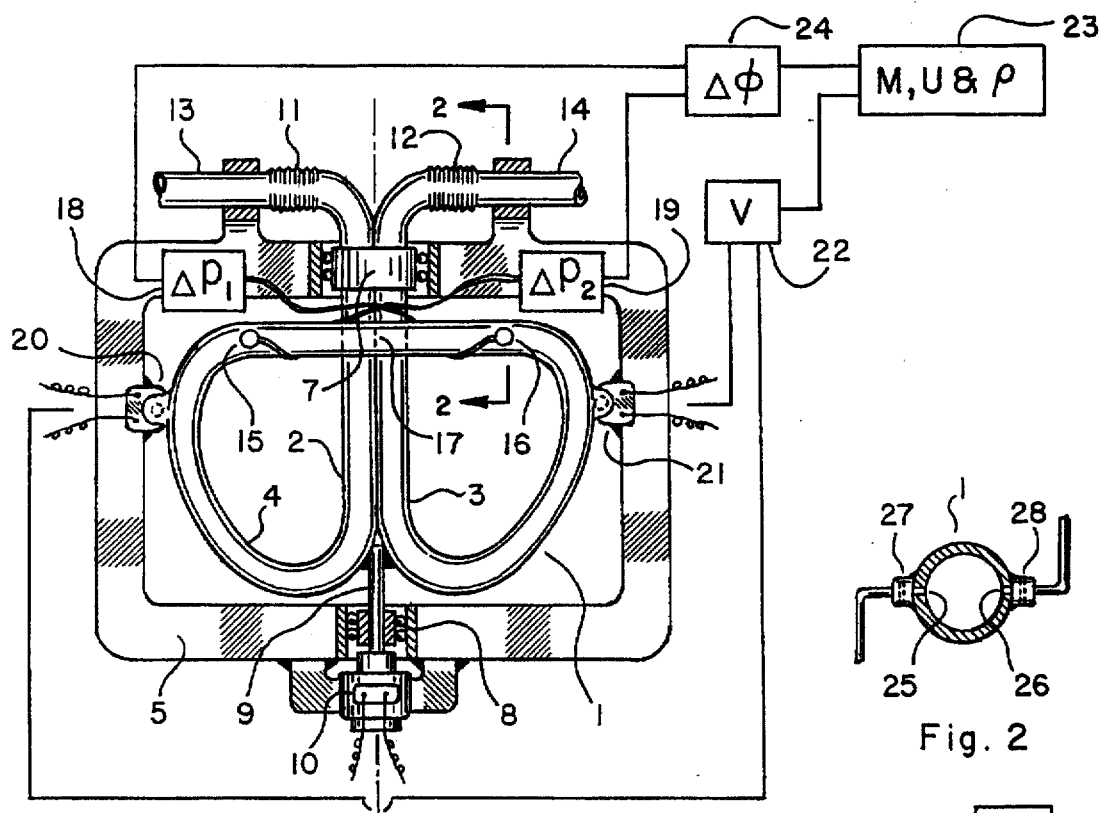
Fig. 1
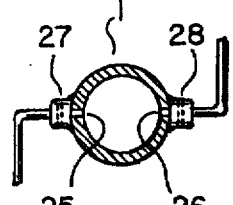
Fig. 2
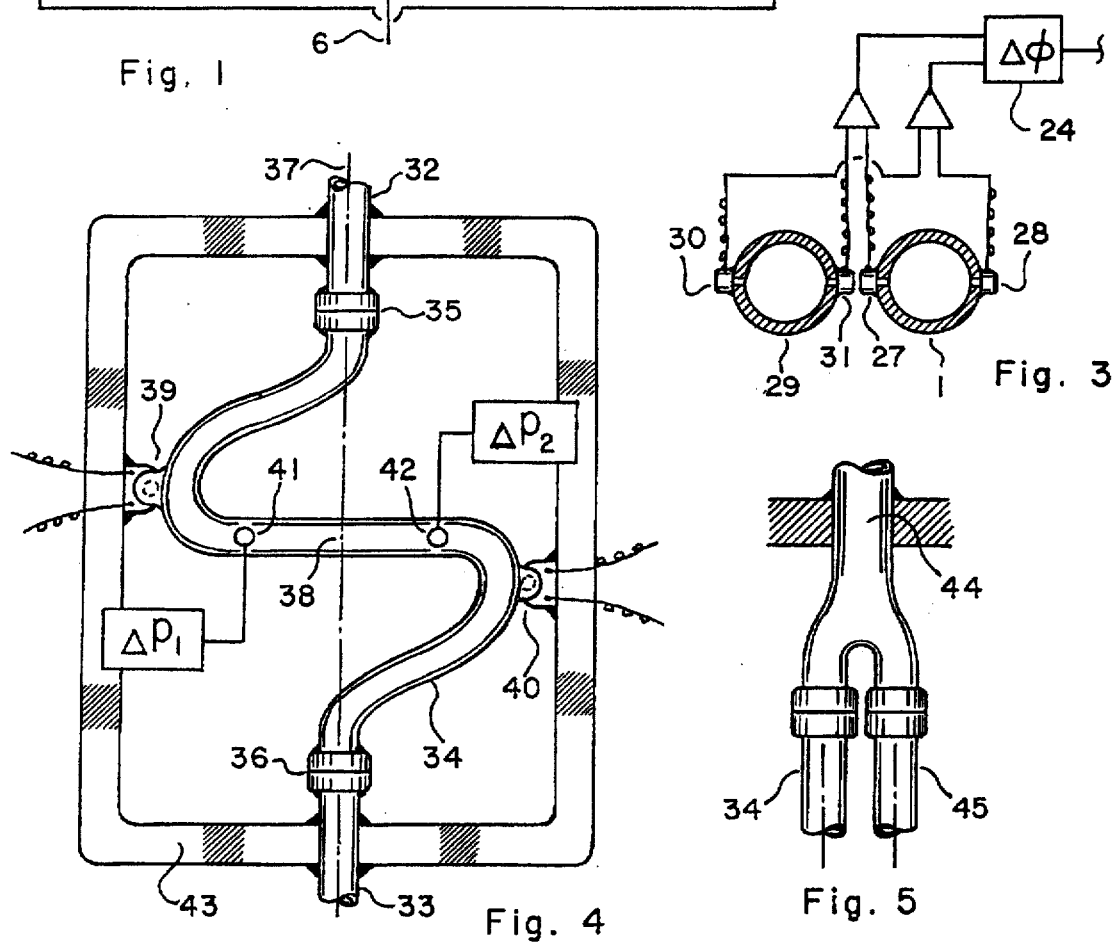
Fig. 3
Fig. 4
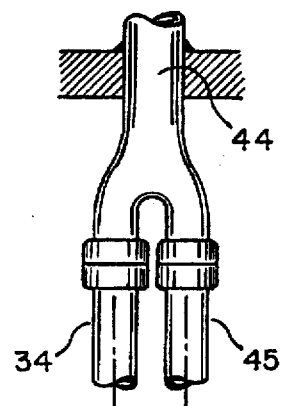
Fig. 5

5,700,958

INERTIA FORCE FLOWMETER WITH TRANSVERSE PRESSURE GRADIENT SENSORS

This patent application is a Continuation-In-Part application to patent application Ser. No. 08/299,362 entitled "Inertia Force Flowmeter" filed on Sep. 1, 1994 and to patent application Ser. No. 08/523,811 entitled "Inertia Force Flowmeter" filed on Sep. 5, 1995.

FIELD OF INVENTION

This invention relates to a flowmeter comprising a conduit under a lateral reciprocating motion in directions perpendicular to the direction of the flow through the conduit, wherein the amplitude of the lateral reciprocating motion of the conduit has a symmetric or antisymmetric distribution about the center section of the conduit; a pair of differential or absolute pressure sensors detecting fluctuating transverse pressure gradient existing in directions parallel to the lateral reciprocating motion of the conduit respectively at two different sections of the conduit; and a device providing information on the velocity of the lateral reciprocating motion of the conduit at a section of the conduit, wherein the mass flow rate of fluid moving through the conduit is determined as a product of a function of a phase difference between two alternating electrical signals respectively generated by the pair of differential or absolute pressure sensors, the spatial mean value of at least one of the two alternating electrical signals respectively generated by the two differential or absolute pressure sensors, and the amplitude of a third alternating electrical signal generated by the device providing information on the velocity of the lateral reciprocating motion of the conduit; and the volume flow rate of the fluid is determined as a product of a function of the phase difference between the two alternating electrical signals respectively generated by the pair of differential or absolute pressure sensors and the amplitude of the third alternating electrical signals representing the lateral reciprocating motion of the conduit.

BACKGROUND OF INVENTION

Without any exceptions, all of the existing versions of the Coriolis force mass flowmeter or the convective inertia force mass flowmeter employ a single or a pair of conduits under a flexural vibration and two vibration sensors respectively detecting the flexural vibration of the conduit at two different sections of the conduit, wherein the mass flow rate of fluid moving through the conduit is determined as a product of an empirically determined constant and a function of phase difference between two alternating electrical signals respectively generated by the two vibration sensors. It can be readily shown by carrying out a reasonably simple mathematical analysis of the flexural vibration of a conduit containing a moving fluid that the above-mentioned empirically determined constant is not an invariant constant in actuality, as this empirically determined constant varies as a function of several dynamic variables such as the amplitude and frequency of the flexural vibration of the conduit, density of the fluid, stiffness of the conduit, etc. As the existing versions of the Coriolis force or inertia force mass flowmeter operate on principles less than completely rigorous and accurate, these mass flowmeters lack the self-calibrating ability and, consequently, these present day versions of the mass flowmeter must be recalibrated time to time in order to maintain a substantially error-free operating condition.

Another short-coming of the existing versions of the Coriolis force or inertia force mass flowmeter is their vulnerability to ambient mechanical vibrations and their inability to measure the mass flow rate of media having low values of density such as gaseous media, which short-coming results from the fact that the existing versions of the Coriolis force or convective inertia force mass flowmeter measures the flexural vibration of the conduit at two different sections thereof and measures a phase difference between the two flexural vibrations of the conduit respectively measured at the two different sections of the conduit. It is readily realized that the phase difference between the two flexural vibration of the conduit respectively occurring at the two different sections of the conduit is a result of the phase difference between two transverse pressure gradients respectively existing at the two different sections of the conduit and, consequently, it is greatly more advantageous to measure the two transverse pressure gradients respectively existing at the two different sections of the conduit rather than measuring the flexural vibration of the conduit at the two different sections of the conduit, and determine the mass flow rate of fluid as a function of the phase difference between the two transverse pressure gradients instead of the phase difference between the two flexural vibrations. The present invention teaches a new method and structural embodiments for measuring directly the convective inertia force experienced by the fluid media moving through the conduit, wherein transverse pressure gradient existing in the fluid media is detected at two different sections of the conduit and the mass flow of the fluid media is determined as a function of a phase difference between the two transverse pressure gradients. As the inertia force flowmeter of the present invention detecting the transverse pressure gradients at two different sections of the conduit and obtaining the phase difference between the two transverse pressure gradients as a measure of mass flow rate of fluid media measures the convective inertia force experienced by the fluid media directly instead of measuring an effect of the convective inertia force in the form of the resulting flexible vibration of the conduit, the present invention provides a new inertia force mass flowmeter calibrating itself on a real time basis and capable of measuring mass flow rate of liquid media as well as gaseous media, which new inertia force mass flowmeter can be constructed in all different sizes varying from a very small diameter to a very large diameter and can be made of a rigid curved pipe or pipes with thick wall as well as of a flexible conduit or conduit with thin wall.

BRIEF SUMMARY OF INVENTION

The primary object of the present invention is to provide an inertia force flowmeter comprising at least one rigid or flexible conduit under a lateral reciprocating motion in directions perpendicular to the direction of flow of fluid contained within the conduit, wherein the distribution of the amplitude of the lateral reciprocating motion of the conduit along the center line of the conduit is symmetric or antisymmetric about the center section of the conduit; and at least a pair of differential or absolute pressure sensors measuring the transverse fluid pressure gradient in directions parallel to the lateral reciprocating condition of the conduit respectively at two different sections of the conduit respectively located on the two opposite sides of the center section of the conduit, wherein the mass flow rate of fluid moving through the conduit is determined as a function of an electrical variable related to a phase difference between two alternating electrical signals respectively generated by the pair of differential or absolute pressure sensors.

Another object is to provide the inertia force flowmeter described in the afore-mentioned primary object of the present invention, wherein the inertia force flowmeter further comprises a device measuring the amplitude of the fluctuation in the fluid pressure resulting from the lateral reciprocating motion of the conduit and/or measuring the amplitude of velocity of the lateral reciprocating motion of the conduit, wherein the mass flow rate of the fluid is determined as a function of the phase difference between the two alternating electrical signals respectively generated by the pair of differential or absolute pressure sensors and the amplitude of the fluctuation in the fluid pressure and/or the amplitude of the velocity of the lateral reciprocating motion of the conduit.

A further object is to provide the inertia force flowmeter described in the afore-mentioned primary object of the invention, wherein a section or sections of the conduit under the lateral reciprocating motion is connected to the stationary sections of conduits such as the inlet or outlet conduits by a plurality of pivotal couplings providing a relative pivotal movement of at least a minute magnitude between the stationary sections of the conduits and the laterally reciprocating conduit.

Yet another object is to provide the inertia force flowmeter described in the afore-mentioned a further object of the invention, wherein the laterally reciprocating conduit includes an elastic spring providing a spring force keeping the laterally reciprocating conduit at a neutral position in the absence of a vibratory force inducing the lateral reciprocating motion of the conduit.

Yet a further object is to provide the inertia force flowmeter described in the afore-mentioned primary object of the invention, wherein the lateral reciprocating motion of the conduit is created by a torsional electromagnetic vibrator.

Still another object is to provide the inertia force flowmeter described in the afore-mentioned primary object of the invention, wherein the lateral reciprocating motion of the conduit is created by a linear electromagnetic vibrator.

Still a further object is to provide the inertia force flowmeter described in the afore-mentioned primary object of the invention, wherein the lateral reciprocating motion of the conduit is created by a powered rotating or reciprocating machine with a mechanical linkage kinematically producing the lateral reciprocating motion of the conduit.

Yet still another object is to provide the inertia force flowmeter described in the afore-mentioned primary object of the invention, wherein the lateral reciprocating motion of the conduit is created by an alternating pivotal motion of the conduit about a pivot axis as a result of an alternating torque about the pivot axis exerted on the conduit.

Yet still a further object is to provide the inertia force flowmeter described in the afore-mentioned yet still another object of the invention, wherein the conduit is pivotally supported about the pivot axis.

These and other objects of the invention will become clear as the description of the invention progresses.

BRIEF DESCRIPTION OF FIGURES

The present invention may be described with a greater clarity and specificity by referring to the following figures:

FIG. 1 illustrates an embodiment of the inertia force flowmeter of the present invention, that employs a conduit of cardioid shape.

FIG. 2 illustrates a cross section of the conduit included in the inertia force flowmeter shown in FIG. 1.

FIG. 3 illustrates a cross section of a parallel pair of conduits included in a modified version of the inertia force flowmeter shown in FIG. 1.

FIG. 4 illustrates another embodiment of the inertia force flowmeter of the present invention, that employs a conduit of S-shape.

FIG. 5 illustrates a common inlet or outlet section, that is bifurcated into a pair of parallel conduits included in a modified version of the inertia force flowmeter shown in FIG. 4.

DESCRIPTION OF OPERATING PRINCIPLES

Figure 6:
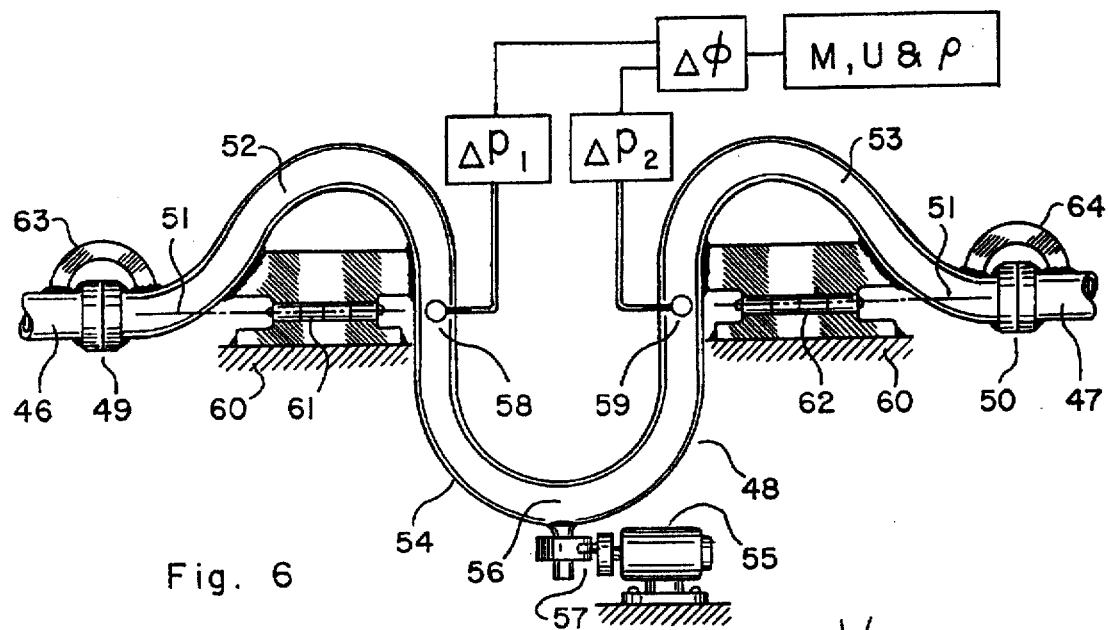
FIG. 6 illustrates a further embodiment of the inertia force flowmeter of the present invention, that employs a conduit with a curved section turning in a first direction intermediate two curved sections turning in a second direction opposite to the first direction.

It can be shown by carrying out a reasonably uncomplicated mathematical analysis of solving the equation of motion of the conduit under a transverse reciprocating motion or a flexural vibration and the equation of motion of fluid moving through the conduit simultaneously, that the mass flow rate M of fluid moving through the conduit is related to the phase angle difference $\Delta\phi$ between two transverse pressure gradients existing in the fluid respectively at two different sections of the conduit located symmetrically about the midsection of the conduit by the following equation:

$$M = \frac{\omega^2 \rho L A V}{2V(0) \frac{dV}{dx}} \tan\left(\frac{\Delta\phi}{2}\right), \quad (1)$$

where $\omega$ is the circular frequency of the transverse reciprocating motion or flexural vibration of the conduit, $\phi$ is the density of fluid, L is the length of the conduit between the two opposite fixed ends of the conduit, A is the cross sectional area of the flow passage provided by the conduit, V is the amplitude of the oscillatory velocity of the transverse reciprocating motion or flexural vibration of the conduit occurring at either one of the two sections of the conduit, $V(0)$ is the amplitude of the oscillatory velocity of the transverse reciprocating or flexural vibration of the conduit occurring at the midsection of the conduit, and x is the distance measured from the midsection of the conduit following the center line of the conduit. The mathematical analysis yielding the afore-presented equation (1) also provides the following relationship:

$$\Delta p = \frac{4\omega \rho A V}{\pi D}, \qquad (2)$$

where $\Delta p$ is the amplitude of the fluctuation in the differential pressure across the diameter D of the cross section of the flow passage occurring at either of the two sections of the conduit in directions parallel to the direction of the reciprocating motion or flexural vibration of the conduit. When equation (2) is solved for V and the resulting relationship is substituted into equation (1) in order to eliminate V appearing in equation (1), the following equation is obtained:

$$M = \frac{\pi \omega D L \Delta p}{8 V(0) \frac{dV}{dx}} \tan\left(\frac{\Delta \phi}{2}\right). \qquad (3)$$

Since $V(0)$ and V are proportional to one another, equation (3) can be written in the following forms:

$$M = K_1 \frac{\omega \Delta p}{V^2} \tan\left(\frac{\Delta \phi}{2}\right), \qquad (4)$$

$$M = K_2 \frac{\omega \Delta p}{[V(0)]^2} \tan\left(\frac{\Delta \phi}{2}\right). \qquad (5)$$

where $K_1$ and $K_2$ are constants intrinsic to the geometrical structure and the material making up the conduit, which constants are empirically determined by calibrating the inertia force flowmeter. In equations (4) and (5), the amplitude of fluctuation $\Delta p$ of the differential pressure occurring in the directions of the reciprocating motion or flexural vibration of the conduit may be measured at either one of the two sections of the conduit or at the midsection of the conduit as these two measured values are proportional to one another. When the amplitude of the oscillatory velocity of the reciprocating motion or flexural vibration of the conduit is maintained at a constant value, equations (4) and (5) can be written in the form $$M = K_3 \omega \Delta p \tan\left(\frac{\Delta \phi}{2}\right). \qquad (6)$$

If the frequency of the reciprocating motion or flexural vibration of the conduit is maintained at a constant value, equation (6) can be written in the form $$M = K_4 \Delta p \tan\left(\frac{\Delta \phi}{2}\right). \qquad (7)$$

When the fluid media has a constant density, equation (8) takes a a further simplified form $$M = K_5 \tan\left(\frac{\Delta \phi}{2}\right). \qquad (8)$$

In equations (6), (7) and (8), the constants of proportionality $K_3$, $K_4$ and $K_5$ are determined empirically by calibrating the inertia force flowmeter. The mass flow rate of fluid media moving through the conduit under the transverse reciprocating motion or flexural vibration is determined by using one of the above-listed equations (1), (3), (4), (5), (6), (7) and (8) in exact or approximate manner in the present invention. When the phase angle difference $\Delta \phi$ has values less than five degrees or so, the tangent value thereof can be approximated by the value of the phase angle difference in radians.

Since the mass flow rate of fluid is equal to the volume flow rate of fluid times the density of fluid, equation (8) can be written in the following form:

$$U = \frac{\omega^2 L V}{2 V(0) \frac{dV}{dx}} \tan\left(\frac{\Delta \phi}{2}\right), \qquad (9)$$

where U is the velocity of the fluid, which can be determined from equation (9) or one of the following equivalent versions of equation (9):

$$U = C_1 \frac{\omega^2}{V} \tan\left(\frac{\Delta \phi}{2}\right), \qquad (10)$$

$$U = C_2 \frac{\omega^2}{[V(0)]} \tan\left(\frac{\Delta \phi}{2}\right), \qquad (11)$$

or $$U = C_3 \tan\left(\frac{\Delta \phi}{2}\right), \qquad (12)$$

where $C_1$, $C_2$ and $C_3$ are empirically determined constants of proportionality, of which numerical values are obtained by calibrating the inertia force flowmeter.

The phase angle difference $\Delta \phi$ appearing in equations (1), and (3) through (12) can be most accurately and economically obtained from two alternating electrical signals respectively generated by a pair of differential pressure sensors detecting the fluid pressure gradient in directions parallel to the direction of the transverse reciprocating motion or flexural vibration of the conduit or by a pair of vibration sensors detecting the transverse reciprocating motion or flexural vibration of the conduit, which pair of detecting devices are located symmetrically about a plane intersecting perpendicularly with the midsection of the conduit, by using one of the better known methods which are described as follows: One of the most familiar method is to measure the time interval $\Delta T$ between the consecutive zero-crossings of the two alternating electrical signals, measure the period T of either one of the two alternating electrical signals, and determine the phase angle difference by using equation $$\Delta \phi = 2\pi \frac{\Delta T}{T}. \qquad (13)$$

Another method is to measure a first and second values of one of the two alternating electrical signals respectively at two different instants when the other of the two alternating electrical signals reaches a zero value and a peak value, respectively, and determine the phase angle difference by using equation $$\tan(\Delta \phi) = \frac{E_1(t)|E_2(t) = 0}{E_1(t)|E_2(t) = \text{peak}}, \qquad (14)$$

where $E_1(t)$ and $E_2(t)$ are the two alternating electrical signals. A further method is to obtain the two alternating electrical signals having the same amplitude or the normalized form of the two alternating electrical signals, and form the differential and additive combination of the two alternating electrical signals obtained in the particular form. The phase angle difference is determined by using equation $$\tan\left(\frac{\Delta \phi}{2}\right) = \frac{\text{AMP} \cdot [e_1(t) - e_2(t)]}{\text{AMP} \cdot [e_1(t) + e_2(t)]}, \qquad (15)$$

where $e_1(t)$ and $e_2(t)$ are the two alternating electrical signals obtained in the above-mentioned particular form.

An invention made by the same inventors as those of the present invention and disclosed in a patent application Ser.

No. 08/341,027 entitled "Phase measuring method and its applications to measuring instruments" filed on Nov. 17, 1994, shows a generalized version of the method defined by equation (15). In this method, the differential combination and the additive combination of the two alternating electrical signals $E_1(t)$ and $E_2(t)$ are formed a without equalizing the amplitudes of the two alternating electrical signals or without normalizing the two alternating electrical signals; and the phase angle difference is obtained by the following equation:

$$\tan\frac{\Delta\phi}{2} = \sqrt{\frac{\left|\left[\frac{(AMP \cdot \Delta E)}{(AMP \cdot \Sigma E)}\right]^2 - \left[\frac{(\Delta AMP \cdot E)}{(\Sigma AMP \cdot E)}\right]^2\right|}{1 - \left[\frac{(\Delta AMP \cdot E)}{(\Sigma AMP \cdot E)}\right]^2 \left[\frac{(AMP \cdot \Delta E)}{(AMP \cdot \Sigma E)}\right]^2}} \quad (16)$$

where $\Delta E$ and $\Sigma E$ are respectively the differential and additive combinations of the two alternating electrical signals $E_1(t)$ and $E_2(t)$, and $\Delta AMP.E$ and $\Sigma AMP.E$ respectively stand for the difference and the sum of the amplitudes of the two alternating electrical signals. Of course, it must be understood that an approximate form of equation (14), (15), or (16) rather than the exact form of each equation may be used. For example, the tangent of one half of the phase angle difference may be approximated by one half of the phase angle difference in the unit of radians, when the phase angle difference is less than five degrees or so.

It becomes immediately clear from the foregoing description of the operating principles of the present invention that, firstly, the present invention teaches much more precise formula relating the phase angle difference between two alternating electrical signals generated by a pair of differential or absolute pressure sensors detecting the transverse fluid pressure gradient existing in directions parallel to the lateral reciprocating motion of the conduit or by a pair of motion sensors detecting the flexural vibration of the conduit, to the mass flow rate of fluid moving through the conduit under the lateral reciprocating motion or the lateral flexural vibration, which formula determines the mass flow rate of fluid not only very accurately but also in a self-calibrating manner on a real time basis; and secondly, the use of a pair of differential or absolute pressure sensors detecting the transverse fluid pressure gradient as taught by the present invention in place of the pair of motion sensors employed in the existing versions of the Coriolis force mass flowmeter, provides two alternating electrical signals much more accurately and sensitively representing the convective inertia force experienced by the fluid moving through the conduit respectively at two different sections of the conduit compared with the existing practice employing the pair of motion sensors and, consequently, the present invention provides a new method for measuring the mass flow rate and a new generation inertia force mass flowmeter that can employ a rigid pipe with a thick wall as well as a flexible conduit with a thin wall, which new technology of the inertia force mass flowmeter is capable of measuring the mass flow rate of gaseous media as well as liquid media. The inertia force flowmeter of the present invention is also perfectly suited for the construction of mass flowmeters of all sizes from mass flowmeters with a very small conduit diameter to mass flowmeters with very large conduit diameter.

DESCRIPTION OF ILLUSTRATED EMBODIMENTS

In FIG. 1, there is illustrated a plan view of an embodiment of the inertia force flowmeter of the present invention. A conduit 1 with the generally straight inlet section 2 and the generally straight outlet section 3 and a looped midsection of cardioid shape 4, is pivotally supported by a supporting structure 5 about a pivot axis 6 by means of a pair of frictionless bearings 7 and 8 respectively supporting the combination of the inlet and outlet sections 2 and 3 of the conduit 1 and a shaft 9 of a torsional vibrator 10 disposed coaxially with the pivot axis 6 and affixed to one end of the combination of the inlet and outlet sections 2 and 3 of the conduit 1 at the extremity of the shaft 9. The other end of the combination of the inlet and outlet sections 2 and 3 of the conduit 1 include a pair of flexible conduit couplings 11 and 12 such as the bellow conduit couplings, which connect the inlet and outlet sections 2 and 3 of the conduit 1 respectively to two sections 13 and 14 of the pipe line. The two opposite halves of the looped midsection 4 of the conduit 1 respectively includes two differential or absolute pressure sensors 15 and 16 disposed symmetrically about the center section 17 of the conduit 1, which pair of differential or absolute pressure sensors 15 and 16 detect the transverse fluid pressure gradient existing in the directions generally perpendicular to a plane defined by the center line of the looped midsection 4 of the conduit 1 respectively at two different sections of the conduit 1 located symmetrically about the center section 17 of the conduit 1. It should be noticed that the conduit 1 has a geometry that is also symmetric about the center section 17 of the conduit 1 as well as about a plane including the pivot axis 6. The pair of differential or absolute pressure sensors 15 and 16 are respectively connected fluid dynamically or electrically to a pair of transducers 18 and 19, which convert the alternating transverse fluid pressure gradient respectively existing at the two different sections of the conduit 1 into two alternating electrical signals. At least one of the pair of motion sensors 20 and 21 may be included in the embodiment of the inertia force flowmeter in order to generate a third alternating electrical signal representing the lateral reciprocating motion of the conduit 1 resulting from the pivotal vibration of the conduit 1 about the pivot axis 6, that is generated by the torsional vibrator 10. In an alternative design of the embodiment, the pair of motion sensors 20 and 21 may be substituted with a pair of electromagnetic vibrator exerting an alternating torque on the conduit 1 about the pivot axis 6, while the torsional vibrator 10 may be substituted with a pivotal motion sensor detecting the amplitude of the alternating torsional vibration of the conduit 1 about the pivot axis 6.

The pair of pressure sensors 15 and 16 respectively generate two alternating electrical signals representing the convective inertia force experienced by the fluid moving through the conduit 1 respectively at the two different cross sections of the conduit 1 whereat the alternating transverse fluid pressure gradient is detected respectively by the pair of pressure sensors 15 and 16, while the pair of vibratory motion sensors 20 and 21 generates a third alternating electrical signal representing the velocity of the lateral reciprocating motion of the conduit 1 created by the pivotal vibration of the conduit 1 about the pivot axis 6 as a result of the action of the torsional vibrator 10. In determining the mass flow rate and/or the fluid velocity by using one of equations (3) through (8) and/or one of equations (10) through (12), the phase angle $\Delta\phi$ is derived from the two alternating electrical signals respectively generated by the pair of pressure sensors 15 and 16 by using one of equations (13) through (16) or by using one of the approximate versions of those equations, while the amplitude $\Delta P$ of the fluctuating fluid pressure is derived as a mean value of amplitudes of the two alternating electrical signals respectively provided by the pair of pressure sensors 15 and 16. Of course, the amplitude V or V(0) of the lateral reciprocating velocity of the conduit 1 is derived from the amplitude of the third alternating electrical signal provided by the combination of pair of the vibratory motion sensors 20 and 21. The conversions from the amplitudes of the alternating electrical signals to the amplitudes of physical variables respectively represented by the alternating electrical signals are executed by the transducers or data analyzers 18, 19 and 22, respectively, Which transducers or data analyzers supply the information required to determine the mass flow rate and/or the fluid velocity to a data processor 23, that actually determines the mass flow rate of the fluid and/or the fluid velocity by using an empirical counterpart of one of equations (3) through (8) and/or by one of equations (10) through (12). The data processor 23 may also determine the density of the fluid as the ratio of the mass flow rate to the volume flow rate of the fluid. Of course, the information provided by the pair of pressure transducers 18 and 19 are supplied to the data processor 23 in the form of an electrical variable related to a phase angle difference $\Delta\phi$ between the two alternating electrical signals respectively generated by the pair of pressure sensors 15 and 16, which conversion of the information is executed by a phase angle difference measuring device 24.

Unlike the conventional method of operating the existing versions of the Coriolis force mass flowmeter, wherein the conduit included in the mass flowmeter has to be flexurally vibrated at one of its natural frequencies of the flexural vibration thereof, the conduit included in the inertia force flowmeter of the present invention can be laterally reciprocated or flexurally vibrated at any desired frequencies, which may or may not be a natural frequency of the integral assembly of the conduit 1 and the torsional vibrator 10. In order to save electrical energy supplied to the torsional vibrator 10, it may be preferable to pivotally vibrate or flexurally vibrate the conduit 1 at one of its natural frequencies, wherein the data analyzer 22 feeds the information on the natural frequency to the torsional vibrator power supply whereby the torsional vibrator 10 exerts an alternating torque on the conduit 1 at a natural frequency of the torsional vibration of the conduit 1 about the pivot axis 6. It is immediately recognized that the pair of vibratory motion sensors 20 and 21 may be omitted in an economized version of the inertia force flowmeter. It is also noticed that, in an alternative design wherein the conduit 1 has a thin wall providing a flexibility for the conduit, the frictionless bearings 7 and 8 along with the combination of the shaft 9 and the torsional vibrator 10 can be omitted, and the combination of the inlet and outlet sections 2 and 3 of the conduit 1 is fixedly secured to the supporting structure 9 at the extremity thereof where the frictionless bearing 7 was disposed. Of course, in such modified version of the inertia force flowmeter, the pair of the vibratory motion sensors 20 and 21 must be substituted with a pair of electromagnetic vibrator exerting an alternating torque on the conduit 1 about the pivot axis 6. It is readily recognized that, when the mass flow rate of the fluid and/or the velocity of the fluid is determined by using one of equations (6) through (8) and/or equation (12), the pair of vibratory motion sensors 20 and 21 can be omitted from the particular embodiment as there is no need to measure V or V(0). The circular frequency of the pivotal vibration of the conduit 1 can be readily obtained by measuring the circular frequency of any one of the alternating electrical signals provided by the pair of pressure sensors 15 and 16, and the combination of the pair of vibratory motion sensors 20 and 21.

In FIG. 2, there is illustrated a cross section of the conduit 1 included in the embodiment of the inertia force flowmeter illustrated in FIG. 1, which cross section is taken along plane 2—2 as shown in FIG. 1 whereat the differential or absolute pressure sensor 16 is disposed. The pressure sensor 15 or 16 may comprise simple pressure tapping holes 25 and 26 respectively extending through two diametrically opposite portions of the conduit wall in an inline relationship along a line substantially perpendicular to a plane defined by the center line of the looped midsection 4 of the conduit 1. In such arrangement of the pressure tapping holes 25 and 26, the tapped fluid pressures through the pressure tapping holes 25 and 26 may be supplied to the differential pressure transducer 18 or 19 directly or across the barrier diaphragms 27 and 28 respectively transmitting the fluid pressures without allowing any leak of the fluid thereacross. In an alternative design, the pressure sensor 15 or 16 may comprise a pair of solid state pressure transducer respectively integrated into the two barrier diaphragms 27 and 28, which pair of solid state pressure sensors are connected to the differential pressure transducers 18 or 19 by a plurality of lead wires.

In FIG. 3, there is illustrated a cross section of a pair of parallel conduits 1 and 29 included in a modified version of the embodiment of the inertia force flowmeter illustrated in FIG. 1, which cross section of the modified version of the embodiment shown in FIG. 1 is equivalent to the cross section of the original version of the embodiment shown in FIG. 2. The modified version of the embodiment shown in FIG. 1 includes another conduits 29 having the same geometry as that of the conduit 1 and disposed adjacent and parallel to the conduit 1 in a mirror image thereto, wherein the two conduits 1 and 29 are pivotally vibrated about the respective pivot axes in two opposite directions as a pair of electromagnetic vibrators disposed intermediate the two conduits 1 and 29 respectively at two locations represented by the pair of vibratory motion sensors 20 and 21 alternatingly pulls and pushes the two diametrically opposite portions of the looped midsections of the two conduits 1 and 29. The section of each of the two conduits 1 and 29 shown in FIG. 3 includes a pair of solid state pressure sensors 30 and 31 or 27 and 28, wherein the alternating electrical signals provided by the solid state pressure sensors 27 and 31 are combined into a first alternating electrical signal, and the alternating electrical signals provided by the solid state pressure sensors 28 and 30 are combined into a second alternating electrical signals, wherein the first and second alternating electrical signals are supplied to the phase angle difference measuring device 24. In an alternative embodiment, the pressure sensors 30 and 31 or 30 and 27 may be omitted. It is also recognized that, in an alternative embodiment, the embodiment shown in FIG. 2 may be modified by omitting one of the two pressure sensors 27 and 28.

In FIG. 4, there is illustrated a plan view of another embodiment of the inertia force flowmeter of the present invention. The inlet leg 32 and the outlet leg 33 of the pipe line disposed in an inline relationship is connected by a S-shaped conduit 34 included in the inertia force flowmeter, wherein the two opposite ends of the S-shaped conduit 34 are respectively connected to the inlet leg 32 and the outlet leg 33 of the pipe line by two pivotable pipe or conduit couplings 35 and 36, which may be of a type such as the rotary pipe coupling or the pivotally flexible pipe coupling shown in FIG. 9 of the parent patent application Ser. No. 08/523,811. The S-shaped conduit 34 is pivotally vibrated about a pivot axis 37 defined by the common center line of the inlet and outlet legs 32 and 33 of the pipe line, which common center line passes through the center section 38 of the S-shaped conduit 34. A pair of electromagnetic vibrators 39 and 40 generates the pivotal vibration of the S-shaped conduit 34 about the pivot axis 37. Two different sections of the S-shaped conduit 34 located symmetrically about the center section 38 of the S-shaped conduit respectively includes two differential or absolute pressure sensors 41 and 42. In an alternative design, the pair of electromagnetic vibrators 39 and 40 may be respectively substituted with a pair of vibratory motion sensors, while a torsional vibrator with a pivotally vibrating portion anchored to the one or both extremities of the S-shaped conduit 34 and the stationary portion anchored to the supporting structure 43 generates the pivotal vibration of the S-shaped conduit about the pivot axis 37. This embodiment of the inertia force flowmeter operates on the same principles as those described in conjunction with FIG. 1.

In FIG. 5, there is illustrated the common inlet or outlet leg 44 of the pipe line, that is bifurcated into two S-shaped conduits 34 and 45 having the same geometry as that shown in FIG. 4, which two S-shaped conduits 34 and 45 are disposed adjacent and parallel to one another, and pivotally vibrated about the respective pivotal axis by the pair of electromagnetic vibrators 39 and 40 disposed intermediate the two S-shaped conduits 34 and 45 in a modified version of the embodiment of the inertia force flowmeter illustrated in FIG. 4. This modified version of the embodiment shown in FIG. 4 may include the pressure sensors disposed in one of the number of different combinations as described in conjunction with FIG. 3.

In FIG. 6, there is illustrated a plan view of a further embodiment of the inertia force flowmeter of the present invention. The inlet leg 46 and the outlet leg 47 of the pipe line having the common center line are connected to one another by a inertia force flowmeter conduit 48 with the two opposite ends connected respectively to the inlet and outlet legs of the pipe line by two pivotable pipe or conduit couplings allowing pivotal movement of the conduit 48 about a pivot axis 51 over at last a minute angle. The conduit 48 included in the inertia force flowmeter includes two curved sections 52 and 53 respectively included in the two opposite extremities of the conduit 48 and a curved midsection 54 disposed intermediate the two curved sections 52 and 53 in a relationship wherein the fluid moving through the curved midsection 54 turns in a first direction, while the fluid moving through the two curved sections 52 and 53 turns in a second direction opposite to the first direction. A mechanical rotating machine powered by an electric motor 55 is kinematically linked to the midsection 56 of the conduit 48 by means of a cam-cam follower combination 57, so that generates pivotal vibration of the conduit 48 about the pivot axis 51 coinciding with the common center line of the inlet and outlet legs of the pipe line. A pair of differential or absolute pressure sensors 58 and 59 are respectively included in the two opposite halves of the conduit 48 in a symmetric relationship with respect to the center section 56 of the conduit 48. The conduit 48 may be supported by a supporting structure pivotally about the pivot axis 51 by means of the hinged supports 61 and 62. This particular embodiment of the inertia force flowmeter works best, when the conduit 48 filled with the fluid is dynamically balanced about the pivot axis 51 and the pair of pressure sensors 58 and 59 are respectively included in two different sections of the conduit 48 located on or close to the plane including the pivot axis 51 and perpendicular to the plane defined by the center line of the conduit 48. The pair of leaf springs 63 and 64 bias the conduit 48 against the pivotal vibration thereof about the pivot axis 51 and, consequently, provides a well defined natural frequency of the pivotal vibration of the conduit 48 about the pivot axis 51. In an alternative embodiment, the supporting hinges 61 and 62 may be omitted. When the conduit 48 has a thin wall providing a flexibility for the conduit 48, the two pivotable pipe or conduit couplings 49 and 50 can be omitted and the two opposite ends of the conduit 48 can be rigidly connected to the inlet and outlet legs 46 and 47 of the pipe line, respectively.

Figure 7:
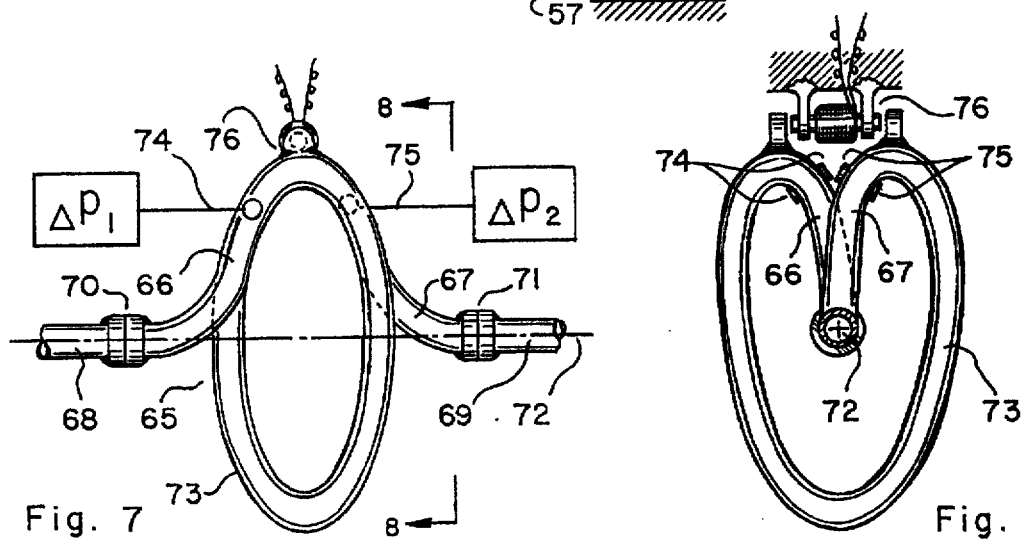
FIG. 7 illustrates yet another embodiment of the inertia force flowmeter of the present invention, that employs a conduit with a looped midsection disposed on a plane obliquely or perpendicularly pierced by a line coinciding with the common center line of the inlet and outlet sections of the conduit.

In FIG. 7, there is illustrated a plan view of yet another embodiment of the inertia force flowmeter of the present invention, that comprises a compoundly curved conduit 65 including two opposite curved end sections 66 and 67 extending towards one another from the respective extremities connected to the inlet leg 68 and the outlet leg 69 of the pipe line by two pivotable pipe or conduit couplings 70 and 71, respectively. The inlet leg 68 and the outlet leg 70 of the pipe line has a common center line, and the two opposite curved end sections 66 and 67 of the conduit 65 are respectively disposed on two opposite sides of a plane including a pivot axis 72 coinciding with the common center line of the inlet and outlet legs of the pipe line in an adjacent and off set relationship, wherein the overhanging extremities of the two opposite curved end sections 66 and 67 of the conduit 65 over lap one another with a small space therebetween, and are connected to one another by a looped midsection 73 of the conduit 65 disposed substantially on a plane pierced by the pivot axis 72 in an oblique or perpendicular relationship. The overhanging extremities of the two opposite curved end sections 66 and 67 of the conduit 65 respectively include two differential or absolute pressure sensors 74 and 75, and the over lapping portions thereof experiences a vibratory force acting in the two opposite directions exerted by an electromagnetic vibrator 76 that generates a relative lateral vibration between the two opposite halves of the conduit 65. When the conduit 65 has a thin wall providing a flexibility for the conduit 65, the pair of pivotable pipe or conduit couplings 70 and 71 can be omitted and the two opposite ends of the conduit 65 can be rigidly connected to the inlet and outlet legs of the pipe line.

Figure 8:
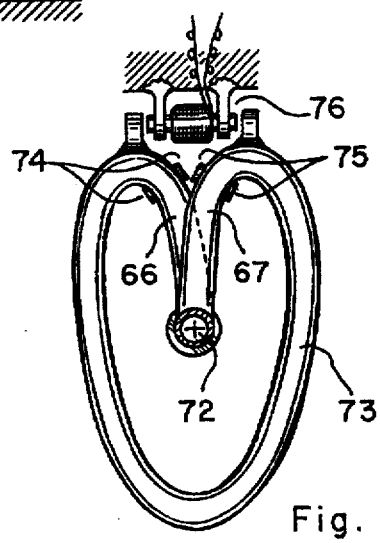
FIG. 8 illustrates another view of the inertia force flowmeter shown in FIG. 7 viewed in a direction parallel to the common center line of the inlet and outlet sections of the conduit.

In FIG. 8, there is illustrated another view of the embodiment illustrated in FIG. 7, which view of the inertia force flowmeter provides a cross section taken along plane 8—8 as shown in FIG. 7. This particular view of the inertia force flowmeter illustrated in FIG. 8 clearly shows how the electromagnetic vibrator 76 generates the relative lateral vibration between the two opposite halves of the conduit 65, particularly between the two opposite curved end sections 66 and 67 of the conduit 65.

Figure 9:
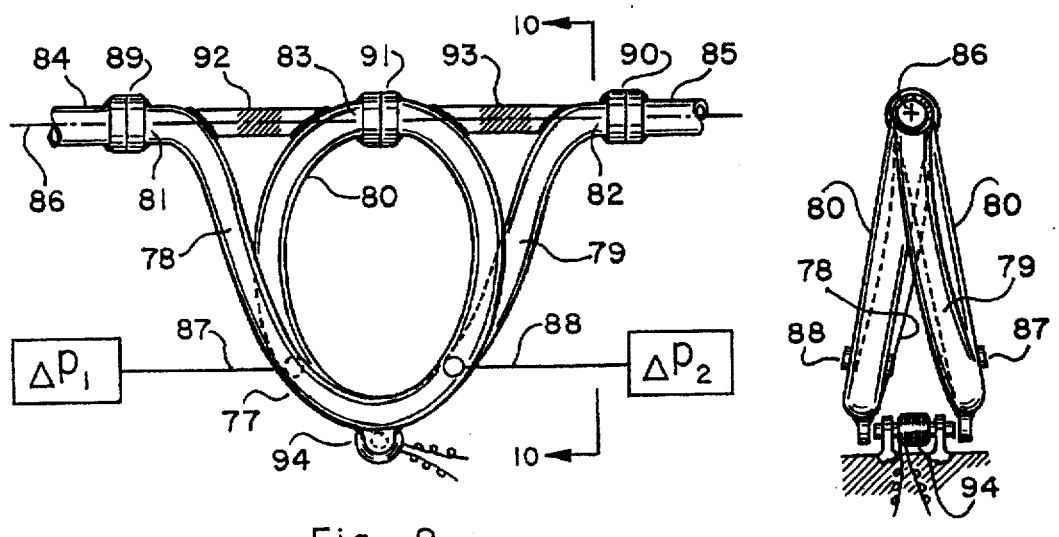
FIG. 9 illustrates yet a further embodiment of the inertia force flowmeter of the present invention, that employs a conduit with a looped midsection disposed substantially parallel to a plane including a line coinciding with the common center line of the inlet and outlet sections of the conduit.

In FIG. 9, there is illustrated a plan view of yet a further embodiment of the inertia force flowmeter, that comprises a simply curved conduit 77 including the two opposite curved end sections 78 and 79 disposed in an off set and approximately parallel relationship, and connected to one another by a looped midsection 80 disposed on a plane approximately parallel to and intermediate the two opposite curved end sections 78 and 79 of the conduit 77. The center lines of the two opposite ends 81 and 82, and the center section 83 of the conduit 77 coincide with the common center line of the inlet leg 84 and the outlet leg 85 of the pipe line, which common center line defines the pivot axis 86. The overhanging extremities of the two opposite curved end sections 78 and 79 of the conduit 77 over lap one another and respectively experience a vibratory force in the two opposite directions exerted by an electromagnetic vibrator 94 that generates a relative lateral vibration between the two opposite halves of the conduit 77. The two opposite halves of the conduit 77 include two differential or absolute pressure sensors 87 and 88, respectively, disposed in a symmetric relationship about the center section 83 of the conduit 77. Two pivotable pipe or conduit couplings 89 and 90 respectively connect the two opposite ends 81 and 82 of the conduit 77 to the inlet leg 84 and the outlet leg 85 of the pipe line in a relationship allowing a pivotal movement of the conduit 77 about the pivot axis 86 over at least a minute angle, while the pivotable pipe or conduit coupling 91 connects the two opposite halves of the conduit 77 to one another. Consequently, the two opposite halves of the conduit 77 are freely and independently pivotable about the pivot axis 86. A pair of leaf springs 92 and 93 bias the relative pivotal motion between the two opposite halves of the conduit 77 for the same purpose as that of the leaf springs 63 and 64 included and described in conjunction with the embodiment shown in FIG. 6. In an alternative embodiment, the pivotable pipe or conduit coupling 91 and the pair of leaf springs 92 and 93 can be omitted. When the conduit 77 has a thin wall providing a flexibility for the conduit 77, all three of the pivotable pipe or conduit couplings 89, 90 and 91 as well as the pair of leaf springs 92 and 93 can be omitted, wherein the the combination of the conduit 77 and the inlet and outlet legs of the pipe line form a rigidly connected continuous flow passage for the fluid moving therethrough.

Figure 10:
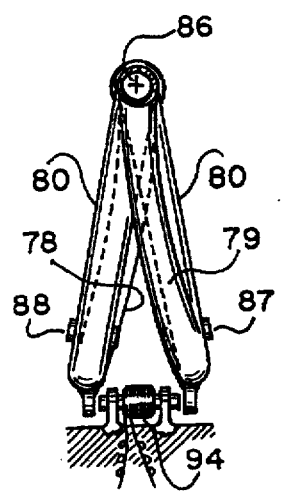
FIG. 10 illustrates another view of the inertia force flowmeter shown in FIG. 9 viewed in a direction parallel to the common center line of the inlet and outlet sections of the conduit.

In FIG. 10, there is illustrated another view of the embodiment of the inertia force flowmeter illustrated in FIG. 9, which view of the inertia force flowmeter provides a cross section taken along plane 10—10 as shown in FIG. 9. This particular view of the inertia force flowmeter illustrated in FIG. 10 clearly shows how the electromagnetic vibrator 94 generates a relative lateral vibration between the two opposite halves of the conduit 77.

It is readily recognized that the pivotal vibrations of various conduits included in different embodiments of the inertia force flowmeter illustrated in FIGS. 1, 4, 6, 7 and 9 produce the lateral reciprocating motions of the conduits with amplitude distribution along the center line of the conduit that vanishes at the two opposite ends of the conduit and is antisymmetric about the center section of the conduit in the embodiments illustrated in FIGS. 1, 4, 7 and 9, and is symmetric about the center section of the conduit in the embodiment illustrated in FIG. 6.

When the lateral reciprocating motion of the conduit 48 included in the embodiment illustrated in FIG. 6 is generated by the cam-cam follower combination 57, the amplitude of the velocity of the lateral reciprocating motion of the conduit V(0) or V of the conduit 48 is proportional to the circular frequency ω of the cam times the length of arm S of the cam. Therefore, equations (4) and (5) can be written in the form.

$$M = K_6 \frac{\Delta P}{\omega} \tan\left(\frac{\Delta\phi}{2}\right). \tag{17}$$

When the rotating speed of the rotating machine 81 remains constant, equation (16) reduces to equation (7). It is readily recognized that equations (10) and (11) also reduce to the form $$U = C_4 \omega \tan\left(\frac{\Delta\phi}{2}\right). \tag{18}$$

When the rotating machine 81 has a constant rate of rotation, equation (18) reduces to equation (12). It should be understood that equations (17) and (18) respectively provide the mass flow rake and the fluid velocity, which are free of error arising from the drift of the dynamic property of the conduit structure and, consequently, provide the most desirable method for operating the inertia force flowmeters of the present invention as well as all of other Coriolis force flowmeter. In determining the mass flow rate of the fluid and/or the fluid velocity by using equations (17) and/or (18), the phase angle difference $\Delta\phi$ is obtained from the phase angle difference between the two alternating electrical signals respectively provided by the pair of pressure sensors 58 and 59, while the amplitude of the transverse fluid pressure gradient $\Delta P$ is obtained from the amplitude of one of the two alternating electrical signals respectively provided by the pair of pressure sensors 58 and 59, or from the mean value of the amplitudes of the two alternating electrical signals respectively provided by the pair of pressure sensors 58 and 59.

It should be understood that, in the modified versions of the embodiments illustrated in FIGS. 1, 4 and 6, wherein the inertia force flowmeters of the present invention employ a pair of conduits having identical geometry disposed adjacent and parallel to one another in a mirror image relationship between the pair of conduits which are laterally reciprocated relative to one another in a mirror image relationship, the pair of conduits may provide a parallel connection between the common inlet leg and the common outlet leg of the pipe line as suggested by the illustration shown in FIG. 5, or may provide a series connection between the inlet leg of the pipe line connected to the inlet extremity of the first of the pair of conduits and the outlet leg of the pipe line connected to the outlet extremity of the second of the pair of conduits wherein the outlet extremity of the first conduit is connected to the inlet extremity of the second conduit by a connecting conduit. The inertia force flowmeters of the present invention work best, when the inlet and outlet legs of the pipe line as well as the connecting conduit are rigidly anchored to a supporting structure at sections adjacent to the inlet and outlet extremities of the conduit or conduits included in the inertia force flowmeter.

While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention in which an exclusive property or privilege is claimed, are defined as follows:

1. An apparatus for measuring flow rate of fluid moving through at least one curved conduit with two opposite extremities restrained from experiencing lateral movements, comprising in combination:

a) at least one curved conduit with two opposite extremities restrained from experiencing lateral movements;

b) means for generating a lateral reciprocating motion of said at least one conduit in directions substantially perpendicular to a reference plane defined by the center line of the conduit in a mode wherein amplitude of the lateral reciprocating motion of said at least one conduit has one of the following two distributions along the center line of the conduit; a symmetric distribution about a center section of the conduit and an antisymmetric distribution about the center section of the conduit;

c) a first pressure sensor for detecting an alternating transverse pressure gradient existing in the fluid in directions parallel to the directions of the lateral reciprocating motion of the conduit at a first section of the conduit belonging to a first half of the conduit, and converting the alternating transverse pressure gradient into a first alternating electrical signals;

d) a second pressure sensor for detecting an alternating transverse pressure gradient existing in the fluid in directions parallel to the directions of the lateral reciprocating motion of the conduit at a second section of the conduit belonging to a second half of the conduit opposite to said first half of the conduit, and converting the alternating transverse pressure gradient into a second alternating electrical signal; and e) means for determining a difference between the first and second alternating electrical signals as a measure of mass flow rate of the fluid moving through said at least one conduit.

2. An apparatus as defined in claim 1 including means for determining the mass flow rate of fluid as a function of the difference between the first and second alternating electrical signals.

3. An apparatus as defined in claim 1, wherein said means for detecting a difference between the first and second alternating electrical signals provides an electrical variable related to a phase angle difference between the first and second alternating electrical signals.

4. An apparatus as defined in claim 3 including means for determining the mass flow rate that determines the mass flow rate of fluid as a function of the electrical variable related to a phase angle difference between the first and second alternating electrical signals.

5. An apparatus as defined in claim 3 including means for detecting amplitude of the alternating transverse pressure gradient at at least a section of the conduit, and means for determining the mass flow rate that determines the mass flow rate of fluid as a product of the amplitude of the alternating transverse pressure gradient and a function of the electrical variable related to a phase angle difference between the first and second alternating electrical signals.

6. An apparatus as defined in claim 3 including means for detecting amplitude of velocity of the lateral reciprocating motion of the conduit at at least a section of the conduit, and means for determining the mass flow rate that determines the mass flow rate of fluid as a ratio of a function of the electrical variable related to a phase angle difference between the first and second alternating electrical signals to the amplitude of velocity of the lateral reciprocating motion of the conduit to an integer power, said integer being equal to one of two integers comprising one and two.

7. An apparatus as defined in claim 3 including means for detecting amplitude of the alternating transverse pressure gradient at at least a section of the conduit, and means for detecting amplitude of velocity of the lateral reciprocating motion of the conduit at at least a section of the conduit; and including means for determining the mass flow rate that determines the mass flow rate of fluid as a product of the amplitude of the alternating transverse pressure gradient and a function of the electrical variable related to a phase angle difference between the first and second alternating electrical signals divided by the amplitude of velocity of the lateral reciprocating motion of the conduit to an integer power, said integer being equal to one of two integers comprising one and two.

8. An apparatus as defined in claim 3 including means for detecting amplitude of the alternating transverse pressure gradient at at least a section of the conduit, means for detecting amplitude of velocity of the lateral reciprocating motion of the conduit at at least a section of the conduit, and means for detecting frequency of the lateral reciprocating motion of the conduit; and including means for determining the mass flow rate that determines the mass flow rate as a product of the frequency of the lateral reciprocating motion of the conduit times the amplitude of the alternating transverse pressure gradient and a function of the electrical variable related to a phase angle difference between the first and second alternating electrical signals divided by the amplitude of velocity of the lateral reciprocating motion of the conduit to an integer power, said integer being equal to one of two integers comprising one and two.

9. An apparatus as defined in claim 1 wherein the conduit has a curved geometry and the two opposite extremities of the conduit respectively include two pivotable conduit couplings disposed coaxially to a pivot axis, wherein the conduit is pivotable about the pivot axis over at least a minute angle.

10. An apparatus as defined in claim 9 including spring bias means for providing a bias spring force against the lateral reciprocating motion of the conduit.

11. An apparatus as defined in claim 9, wherein said means for detecting a difference between the first and second alternating electrical signals provides an electrical variable related to a phase angle difference between the first and second alternating electrical signals, and said combination includes means for determining the mass flow rate that determines the mass flow rate of fluid as a function of the electrical variable related to a phase angle difference between the first and second alternating electrical signals.

12. An apparatus as defined in claim 1 including another conduit having identical geometry as that of said at least one conduit and disposed adjacent to said at least one conduit in a substantially mirror image relationship therebetween; wherein said means for generating a lateral reciprocating motion generates a relative lateral reciprocating motion in a substantially mirror image relationship between said at least a conduit and said another conduit, and at least one of said at least one conduit and said another conduit includes the first and second pressure sensors.

13. An apparatus as defined in claim 12, wherein said means for detecting a difference between the first and second alternating electrical signals provides an electrical variable related to a phase angle difference between the first and second alternating electrical signals.

14. An apparatus as defined in claim 13 including means for determining the mass flow rate that determines the mass flow rate of fluid as a function of the electrical variable related to a phase angle difference between the first and second alternating electrical signals.

15. An apparatus as defined in claim 13 including means for detecting amplitude of the alternating transverse pressure gradient at at least a section of at least one of said at least one conduit and said another conduit, and means for determining the mass flow rate that determines the mass flow rate of fluid as a product of the amplitude of the alternating transverse pressure gradient and function of the electrical variable related to a phase angle difference between the first and second alternating electrical signals.

16. An apparatus as defined in claim 13 including means for detecting amplitude of velocity of the relative lateral reciprocating motion between said at least one conduit and said another conduit at at least a section of the combination of said at least one conduit and said another conduit, and means for determining the mass flow rate that determines the mass flow rate of fluid as a ratio of a function of the electrical variable related to a phase angle difference between the first and second alternating electrical signals to the amplitude of velocity of the relative lateral reciprocating motion to an integer power, said integer being equal to one of two integers comprising one and two.

17. An apparatus as defined in claim 13 including means for detecting amplitude of the alternating transverse pressure gradient at at least a section of the combination of said at least one conduit and said another conduit, and means for detecting amplitude of velocity of the relative lateral reciprocating motion between said at least one conduit and said another conduit at at least a section of the combination of said at least one conduit and said another conduit; and including means for determining the mass flow rate that determines the mass flow rate of fluid as a product of the amplitude of the alternating transverse pressure gradient and a function of the electrical variable related to a phase difference between the first and second alternating electrical signals divided by the amplitude of velocity of the relative lateral reciprocating motion to an integer power, said integer being equal to one of two integers comprising one and two.

18. An apparatus as defined in claim 13 including means for detecting amplitude of the alternating transverse pressure gradient at at least a section of the combination of said at least one conduit and said another conduit, means for detecting amplitude of velocity of the relative lateral reciprocating motion between said at least one conduit and said another conduit at at least a section of the combination of said at least one conduit and said another conduit, and means for detecting frequency of the relative lateral reciprocating motion between said at least one conduit and said another conduit; and including means for determining the mass flow rate that determines the mass flow rate of fluid as a product of the frequency of the relative lateral reciprocating motion times the amplitude of the alternating transverse pressure gradient and a function of the electrical variable related to a phase angle difference between the first and second alternating electrical signals divided by the amplitude of velocity of the relative lateral reciprocating motion to an integer power, said integer being equal to one of two integers comprising one and two.

19. An apparatus as defined in claim 12 wherein each of said at least one conduit and said another conduit has a curved geometry and the two opposite extremities of each of said at least one and said another conduit respectively include two pivotable conduit couplings disposed coaxially to a pivot axis, wherein each of said at least one and another conduit is pivotable about the respective pivot axis over at least a minute angle.

20. An apparatus as defined in claim 19 including spring bias means for providing a bias spring force against the relative lateral reciprocating motion between said at least one conduit and said another conduit.

* * * * *